(12) United States Patent
Wellisch et al.

(10) Patent No.: US 10,916,101 B2
(45) Date of Patent: Feb. 9, 2021

(54) SYSTEM AND METHOD FOR A MEDIA PLATFORM

(71) Applicants: Adam Wellisch, Melbourne (AU); Joshua Wellisch, Melbourne (AU); Dion Sullivan, Mill Valley, CA (US)

(72) Inventors: Adam Wellisch, Melbourne (AU); Joshua Wellisch, Melbourne (AU); Dion Sullivan, Mill Valley, CA (US)

(73) Assignee: MSM Holdings Pte., The Globe (SG)

( * ) Notice: Subject to any disclaimer, the term of this patent is extended or adjusted under 35 U.S.C. 154(b) by 218 days.

(21) Appl. No.: 15/746,786

(22) PCT Filed: Sep. 30, 2016

(86) PCT No.: PCT/US2016/054883
§ 371 (c)(1),
(2) Date: Jan. 22, 2018

(87) PCT Pub. No.: WO2017/059298
PCT Pub. Date: Apr. 6, 2017

(65) Prior Publication Data
US 2020/0082672 A1    Mar. 12, 2020

Related U.S. Application Data

(60) Provisional application No. 62/236,513, filed on Oct. 2, 2015.

(51) Int. Cl.
*G07F 17/32*  (2006.01)
*A63F 13/35*  (2014.01)
*A63F 13/798* (2014.01)
*G06Q 30/02*  (2012.01)
*H04N 21/8545* (2011.01)

(52) U.S. Cl.
CPC .......... *G07F 17/3276* (2013.01); *A63F 13/35* (2014.09); *A63F 13/798* (2014.09); *G06Q 30/02* (2013.01); *G07F 17/3288* (2013.01); *H04N 21/8545* (2013.01)

(58) Field of Classification Search
CPC .... G07F 17/3276; A63F 13/35; A63F 13/798; G06Q 30/02
See application file for complete search history.

(56) References Cited

U.S. PATENT DOCUMENTS

2012/0196268 A1* 8/2012 Cacciolo, Jr. ....... G07F 17/3272
434/362
2014/0201126 A1* 7/2014 Zadeh .................. A61B 5/4803
706/52

* cited by examiner

*Primary Examiner* — William H McCulloch, Jr.
*Assistant Examiner* — Ankit Doshi
(74) *Attorney, Agent, or Firm* — Eandi Fitzpatrick LLP; William Fitzpatrick (57) ABSTRACT

A method performed by one or more processing devices for conducting a networked contest is provided. The method describes receiving an input from a contestant, extracting a first set of variable rules based on the contestant input, authorizing the contestant for a contest, presenting a media to a consumer, wherein the media is generated by the contestant, receiving an input from the consumer, extracting a second set of variable rules based on the consumer input, responsive to the presented media, receiving a casted vote from the consumer if each of the contestant and the consumer are authorized based on the variable rules sets. A system for conducting a contest is also provided herein.

16 Claims, 7 Drawing Sheets

SYSTEM AND METHOD FOR A MEDIA PLATFORM

CROSS-REFERENCE TO RELATED APPLICATION

The present utility patent application claims the priority benefit of the U.S. provisional application for patent Ser. No. 62/236,513, filed on Oct. 2, 2015, entitled A System and Method for a Media Platform.

FIELD OF THE INVENTION

The present invention relates generally to networked and web-based computer systems. More particularly, the invention relates to an interactive media platform for optimizing media competitions for which prizes and/or rewards are distributed to contestants and users on the network, and a marketplace associated therewith.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The development of the Internet and faster, more robust mobile networks has led to a vast increase in the public's ability to access media that was generally unavailable for public consumption only as late as the early 2000's. As an example, in the field of music, until recently one could only easily access music that was deemed popular by radio stations or by the Billboard® charts. This was simply a function of economics and shelf space, due to brick and mortar constraints of retail music stores. However, digitization and mobile networking has eliminated these "brick and mortar" constraints. As an example, iTunes® and Pandora® Radio has allowed fans and artists to connect where they otherwise couldn't have—particularly as it relates smaller or "indie" artists and their fans all around the globe. Ten to twenty years ago, the likelihood of this connection was very low due to the inherent constraints of old media.

In parallel, mobile application development has led to a new market of goods and services not realized prior to the development of large scale networking and mobile devices (e.g., smartphone), which can be easily procured on mobile application distribution platform such as the Apple App Store, Google Play, Windows Phone Store and BlackBerry® App World. This allows for massively scaled social interaction, contests, competitions and games that, until recently, were not possible.

In the entertainment industry, while talent plays a role in popularity, happenstance has more to do with an artist's popularity than does any organized industry effort. Traditionally, the entertainment industry has relied on word of mouth, agents, and talent calls who are judged by "experts" who attempt to select talent with the best chance of acceptance by the public.

However, sometimes artist or performers talent has little to do with the actual success or entertainment factor the artists may provide to the public. As evidenced by the success of certain "viral" videos, such as those shown on Youtube® or Snapchat®, a determining factor of popularity can only be described as the proverbial "it-factor", since even the most experienced marketing experts don't know exactly what makes certain videos so popular (i.e., viral).

In tandem, reality television shows, such as American Idol® and Americas Got Talent® changed the landscape of how new artists and entertainers are found. The overwhelming popularity of these types of talent shows has led to hundreds of reality-type music and talent competition television shows being broadcast across the globe. Pure talent competitions such as America's Got Talent® have had a massive amount of viewership and success. These types of shows rely on general talents such as magic and comedy, and also lesser known talents such as parkour and contortionism. In these shows, judges narrow the field of artists and entertainers down to who they think are the best or most talented, and the public uses text messaging or dial-in methods of voting for their favorite, and ultimately, the winner.

However, the problems with these past approaches are numerous. For one, artist sample size is extremely small compared to those artists that a user could have voted for. As stated above, in most all of these shows, the voting field is chosen by "expert" judges prior to a chance for public voting. In addition, the voting window is very small—maybe only fifteen minutes to an hour due to the "live" nature of the performances at scheduled broadcast times. However, it is very difficult for judges to recognize "it-factor", which drives viral-type videos in such a short amount of time. Moreover, the contests lack the online networked social elements that are so popular with users today. Consequently, these ad-hoc approaches that exist today do not capture the user's attention in a way that is optimizes value for the fans, artists, talent, operators, and merchants. In other words, many of the approaches that exist today simply do not resonate with users at the point of impression, and do not give artists and entertainers an equal or fair chance to win.

Lastly, while the online voting systems that exist today allow for voting, they not optimized in such a way that allows for certain monetary benefits for the operator, nor are they integrated in such a way to detect some types of fraudulent re-voting.

Accordingly, there is a need for an improved system and method for interactive, network based media platform for contests and the like.

BRIEF DESCRIPTION OF THE DRAWINGS

The present invention is illustrated by way of example, and not by way of limitation, in the figures of the accompanying drawings and in which like reference numerals refer to similar elements and in which.

Unless otherwise indicated illustrations in the figures are not necessarily drawn to scale.

SUMMARY OF THE INVENTION

To achieve the forgoing and other aspects and in accordance with the purpose of the invention, a system and method for an interactive media platform. The system and method provides optimization of user retention value, increased value for user votes, and optimization of computer system architecture to increase speed and allow for fast scalability as it relates to certain networked contests.

In an exemplary embodiment, the method comprises extracting a first set of variable rules based on the contestant input, authorizing the contestant for a contest, presenting a media to a consumer, wherein the media is generated by the contestant, receiving an input from the consumer; extracting a second set of variable rules based on the consumer input, responsive to the presented media, receiving a casted vote from the consumer if each of the contestant and the consumer are authorized based on the variable rules sets.

In an embodiment of the present invention, a system for conducting networked contests the system comprising one or storage devices for storing instructions that are executable to perform operations is provided comprising a plurality of clients operationally coupled with a network, and configured to display an application, a plurality of processing subsystems operationally coupled with the plurality of clients the network, wherein each of the plurality of processing subsystems is configured to receive an input from a contestant, extract a first set of variable rules based on the contestant input; authorize the contestant for a contest, present a media to a consumer, wherein the media is generated by the contestant, receive an input from the consumer, extract a second set of variable rules based on the consumer input, responsive to the presented media, receive a casted vote from the consumer if each of the contestant and the consumer are authorized based on the variable rules sets.

Other features, advantages, and aspects of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

Those skilled in the art will readily recognize, in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

While exemplary embodiments of the present invention will be described with reference to certain types of mobile applications, a skilled artisan will realize that embodiments of the invention are applicable to any type of mobile application and/or web module in which quantitative analyses on user value is beneficial.

As used herein, an "artist" or "competitor" is a person or people (e.g., a band) using the multi-tenant platform to connect with audiences (e.g., users), enter contests, upload content in form of media (e.g., music), and generally promote themselves. The artist may sell and/or offer to users through the system and method described herein.

As used herein, a "competition" represents an opportunity for an artist to enter content, and a user to vote on their favorite of the uploaded content. This may also relate to talent contests, generally.

As used herein, a "consumer" is a user of the platform who is not in a contest.

As used herein, "media" comprises music, print media (books, magazines, newspapers digitized or online consumption), television, movies, video games, short films, video and/or sound clips, and the like.

As used herein, an "operator" is the organization or person(s) who own, or operate, or control of the platform. The operator may, in some embodiments, set contests or competitions, award prizes, gather data, sell data, and the like.

As used herein, a "user" represents the public, or the "fans". The users of the platform will cast and submit votes for their favorite artists, and/or media.

In exemplary embodiments, of the present invention, to be described in greater detail in relation to FIGS. 1-7.

A first embodiment of the present invention will be described which provides systems and methods for networked contest and competitions.

Figure 1:
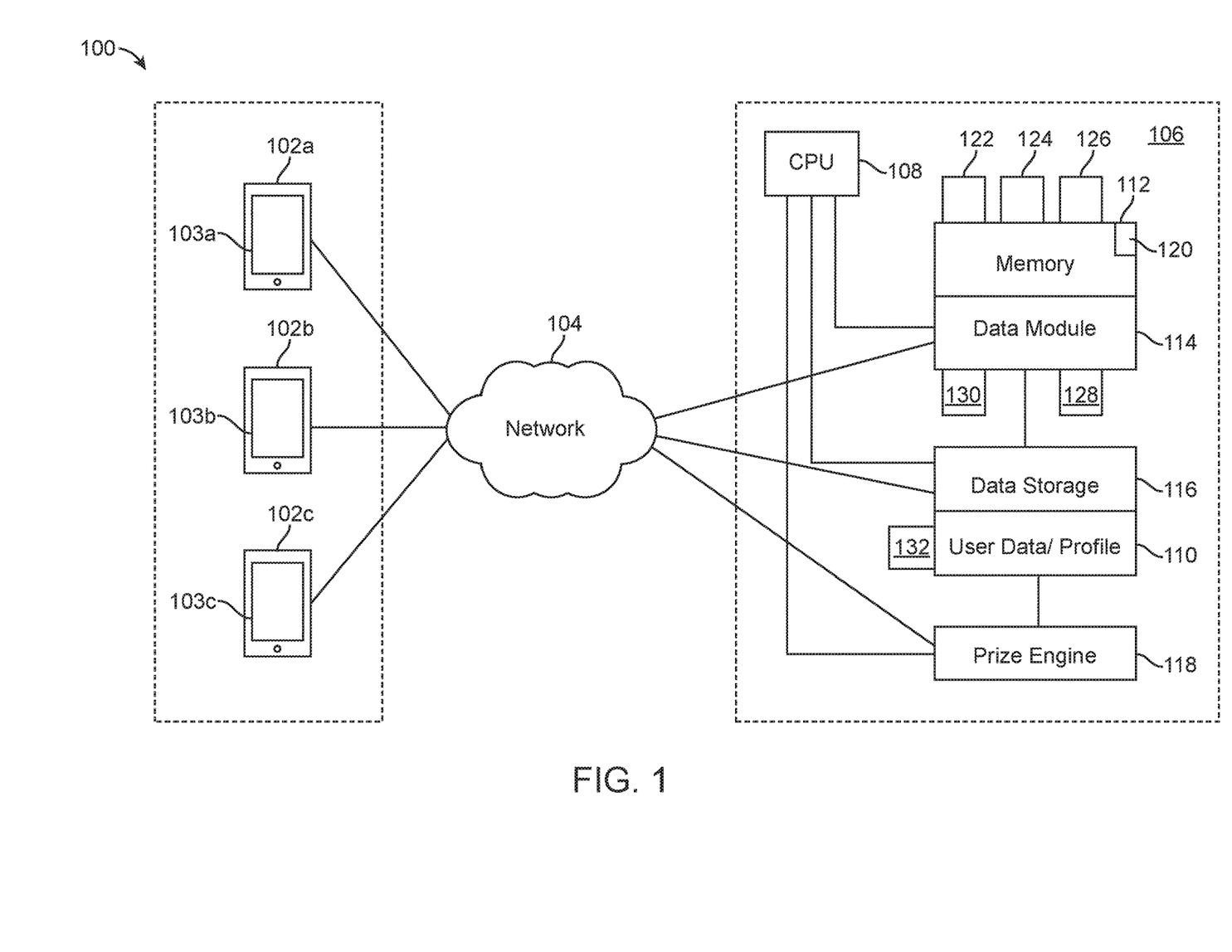
FIG. 1 is a diagram depicting a networked system which may be used by an exemplary web-enabled/networked embodiment of the present invention.

Referring now to FIG. 1, a block diagram depicting an exemplary networked system which may be used together with an exemplary embodiment of the present invention is shown generally at 100.

Clients 102a, 102b and 102c (n+1) represent user devices (e.g., smartphones), at which one or more independent users may participate in a contest ("contestant"), and at which one or more users may participate on the platform generally as a content consumer and voter in the contests ("consumer"). Further, one or more merchants may provide certain services to the contestants or users on the platform. The clients 102a, 102b and 102c, in this exemplary embodiment, are smart phones. While smartphones are shown herein, it should be appreciated that clients 102a-c may also include personal digital assistants, tablet devices, e-readers, wireless music devices and any other personal computing device such as desktops and laptops, which includes at least one of a display, processor, memory or input or output means, together with any electronic device that is used as a platform for audio-visual media. Further, it should be noted that while only three clients 102a, 102b and 102c are shown, the present methods and systems are applicable to large volume networks in the order of hundreds of thousands or millions of clients (n+1).

As shown, the clients 102a-c, in an embodiment of the present invention, may be communicatively connected to each other through network 104, and further communicably connected to at least a server 106 via the network 104. The server 106 may be in further communication with a computing processor 108 and a user database 110, which will be discussed in further detail with relation to FIG. 2.

Clients 102a-c, which in this exemplary embodiment are smart phones, may comprise a CPU, a sensory representation (a visual, auditory, or tactile output such as a graphic display, a tone, or a vibration), a Graphical User Interface (GUI) 103a, 103b, and 103c, having a keyboard/touchpad, a microphone, a memory, a mass memory storage, a graphical user interface, a video camera, an input/output interface and a network interface. The client may also include removable media devices (e.g., memory cards, etc.).

In this exemplary embodiment of the present invention, client 102a may communicate bi-directionally with the server 106 through network 104. The global network 104 may comprise the Internet, local area networks (LANs), wide area networks (WANs), wired telephone networks, wireless networks, or any other network supporting data communication between respective clients, developers, servers, and the like.

The server 106 may comprise a plurality of servers, and be configured for to increase user traffic throughput, which will be discussed in greater detail with relation to FIG. 6. Servers in the exemplary system comprise application servers to provides logic for an application program, proxy servers as an intermediaries between endpoint devices, virtual servers for running shared servers, dedicated blade servers, file servers, and policy server for use in legal compliance and security components of a policy-based network that provides authorization services and facilitates tracking and control of use and files, again, each to be discussed in greater detail with reference to FIG. 6.

The server 106 may comprise a single processor 108 or multiple processors and various types including microcontrollers (e.g., with embedded RAM/ROM) and microprocessors such as programmable devices (e.g., RISC or CISC based, or CPLDs and FPGAs) and devices not capable of being programmed such as gate array ASICs (Application Specific Integrated Circuits) or general purpose microprocessors.

The server 106 comprises memory 112, which is used to transfer data and instructions to processor in a bi-directional manner. Memory 112 may include data module 114, which is configured as short term volatile memory for user memory in cache, and to communicate with mass data storage 116. Virtual storage or memory 120 may be further provided increased speed and security for memory isolation, where needed.

Mass data storage 116 may also be coupled bi-directionally to CPU/processor 108 and provide additional data storage capacity and may include any of the computer-readable media described above. Mass data storage 116 may be used to store programs, data and the like and is typically a secondary storage medium such as a hard disk. It will be appreciated that the information retained within mass data storage 116, may, in appropriate cases, be incorporated in standard fashion as part of memory 112 as virtual memory. It is also to be appreciated that mass data storage may occur off-server.

In exemplary embodiments of the present invention, the storage 114 may comprise user/artist profile database 110 for storing, for example, user profiles. User/artist profile database 110 may store, for example, user voting habits, retention of media, and the like.

In exemplary embodiments, the system further comprises a prize engine 118, in which the operator can set and configure prizes or awards for competitions.

In exemplary embodiments of the present invention, the server may also comprise contest engine 122, voting engine 124, ad module 126, location module 128 and key performance indicator module 130.

Contest engine 122 is configured to allow a user to schedule and control contests. The contest engine 122 is configured to set dates and times for contests, voting windows, and opt-in formats artists to enter contests of their choosing. In exemplary embodiments of the present invention, the contests may be geo-specific, and thus, the contest engine 122 may be in communication with the location module 128. For example, a competition may be related to a localized media, and thus, the contest engine 122 and location module 128 may only offer voting rights to users in a certain and pre-define geographic region. As an example, location module 128 together with contest engine 122 engine may not offer voting rights to a user in Los Angeles, Calif. for a competition with media related to China. In this way, the contest engine 122 is configured to toggle through contests related to information received as an input from the location module 126, and tie those contests to a user in a particular location, if the operator so chose to configure it that way. On the other hand, to increase voting sample size, an operator may opt to turn geo-location off, and allow the entire globe voting rights.

The system may further comprise media engine 124, which is in communication with memory 112. Media engine 124 is configured to gather contestant media, perform an upload function, sort media based on pre-determined indicia, capture analytics regarding, for example, types of media being uploaded, media views, media length, and the like, and output the analytics the operator. Consequently, the systems an operator the ability to ascertain key performance indicators (KPI).

KPI input/output (I/O) engine 130, in this exemplary embodiment, is operator configurable. In this way, the operator can input a set of indicia that is relevant to a particular contest, online process, downloads, voting number, and the like. For example, the KPIs may be a predetermined set of indicia that is dependent upon the type of contest. As an example, it may be predetermined, using past analytical analysis, that a majority of the votes will come from US southern states based on the known popularity of country music, and thus, advertising dollars are allocated to those areas. However, KPI engine 130 may be configured to gauge voting hot spots, and may find that inland California voters are more likely to vote in country music contests than in alternative music contests, for example. Consequently, advertising dollars can be allocated properly in focused regions. In turn, voter numbers will likely increase. In regard to voting, while SMS is described, other methods may be used as well. Furthermore, contest server may be configured to recognize a vote from a user based on either profile information and/or router ID, port ID, and the like. In this way, the contests can be configured to make sure only one user gets one vote. This feature may be turned off so as to allow as many votes per person as the person would like. The operator may attach a financial incentive to the vote, such that a user pays to vote, but is able to earn rewards based on votes. In optional embodiments, the billing system may be identified with a particular SMS origin, and bill the cell phone account or app store account automatically.

To avoid voter fraud, the system is configured to monitor spikes in voting from certain ports which are outside the expected range.

The system may further comprise ad module 126, which is also in communication with memory 120. The ad module is configured to store advertisements which are applied to contests and in embodiments of the present invention. Furthermore, the ad module 126 is configured to exploit user data for target advertising. It may also utilize which KPI data, such as the contests that a user is voting in. Again, using country music as an example, if user is voting primarily in country music contests, ad module 126 is configured to output an advertisement that is related to, for example, cowboy boots. In operation, the system is configured as a thinking machine to maximize user retention.

The system may further comprise payment module 132. Payment module may be configured, in optional embodiments of the present invention, to accept payments using short messaging service (SMS) on a mobile unit. In this way, a user may register their phone and an account, or, the system may bill the mobile carrier in the name of the user, if the user chooses. In other embodiment, the payment module 132 may be configured to charge user credit cards and the like.

Referring still to FIG. 1, in exemplary embodiments of the present invention, the system is downloadable onto smart phone 102. The network 104 may be a clouds, for example an IoS cloud or an android cloud each representing a marketplace of data in which to request and retrieve certain mobile Applications. Other examples BlackBerry, HP webOS, Symbian OS, Bada and Windows Mobile.

Smartphones may communicate via remote connectivity including, but not limited to the Internet, Satellite networks, Cell Phone networks, other wireless networks and standards such as 802.11, 80211.b, 802.11g, or similar wireless LAN operating standards, or Bluetooth technologies, infrared connections, or any other similar technologies or other technologies such as those described above that permit the sending and/or receiving and/or processing of electronic information in either an encrypted or unencrypted format.

Figure 2:
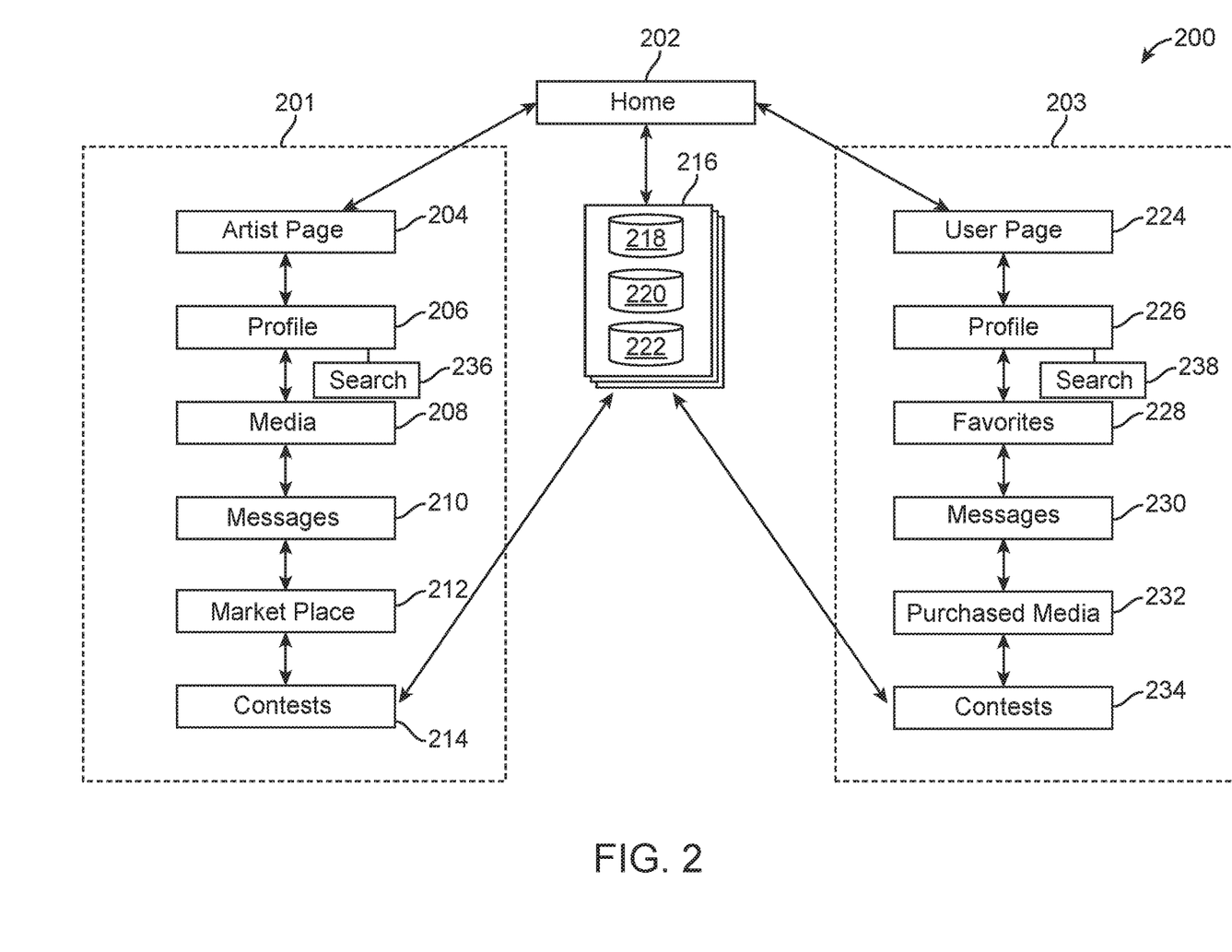
FIG. 2 is a block diagram of an exemplary hardware, software, and firmware framework for embodiments of the present invention.

Referring now to FIG. 2, a more detailed block diagram depicting a system architecture according exemplary embodiment of the present invention is shown generally at 200. The platform 202 generally comprises a contestant side 201, server side 202 and consumer side, side 203.

On the contestant side 201, the server side 202 is configured for media uploads from for controlled viewing to consumer side 203. The server side 202 facilitates data transfer, but also collates and logically sorts data using a plurality of matrices for output to merchants, referred to in greater detail with reference to FIG. 4. The server side 202 also determine how and when the media is viewed and consumed, and by whom it is consumed by based on policy. Each of the artists and users access the platform view home page 204 and 224, respectively, through at network, such as shown in FIG. 1 at reference numeral 104. From home pages 204 and 224, the artist and user may profile 206 and 226, respectively, to manage their personal information, such as, for example, name, age, sex, location, areas of interest, dislikes, email address, hobbies, and occupation The profile may also include a search function, such that a user can search a community and located like-minded individuals who may then recommend contests to the other. In this way, user communities with other individuals in a group section identified by areas of interest.

On artist side 201 media page 208 is provided so that artists can manage media uploads. In this way, artists can choose which media to upload, which media to take down, which media to enter into contests, which media to enter into the marketplace, and further, manage content related to the media. Message page 120 is further provided so that artists can communicate with fans and navigate to areas of interest.

Marketplace page 212 allows user to upload contents to the platform marketplace for purchases by users.

A contest page 214 allows artists to enter a specified competition by queuing a media that is available for review by users who have elected to vote in that particular contest, such as at fan contest page 234.

The showing and management of submissions is managed through one or more stages shown at 216 (e.g., using databases 218, 220 and 222). The contests may be divided based on genre, such as country, alternative, metal, and the like. The contests may also be general talent or best or coolest video.

On the user side, a favorites page 228 saves submissions and contests and recommends contests based on prior contests entered from page 234. This is user configurable as well.

A purchased media page 232 also provides past purchases and provides a further gateway to the marketplace.

Figure 3:
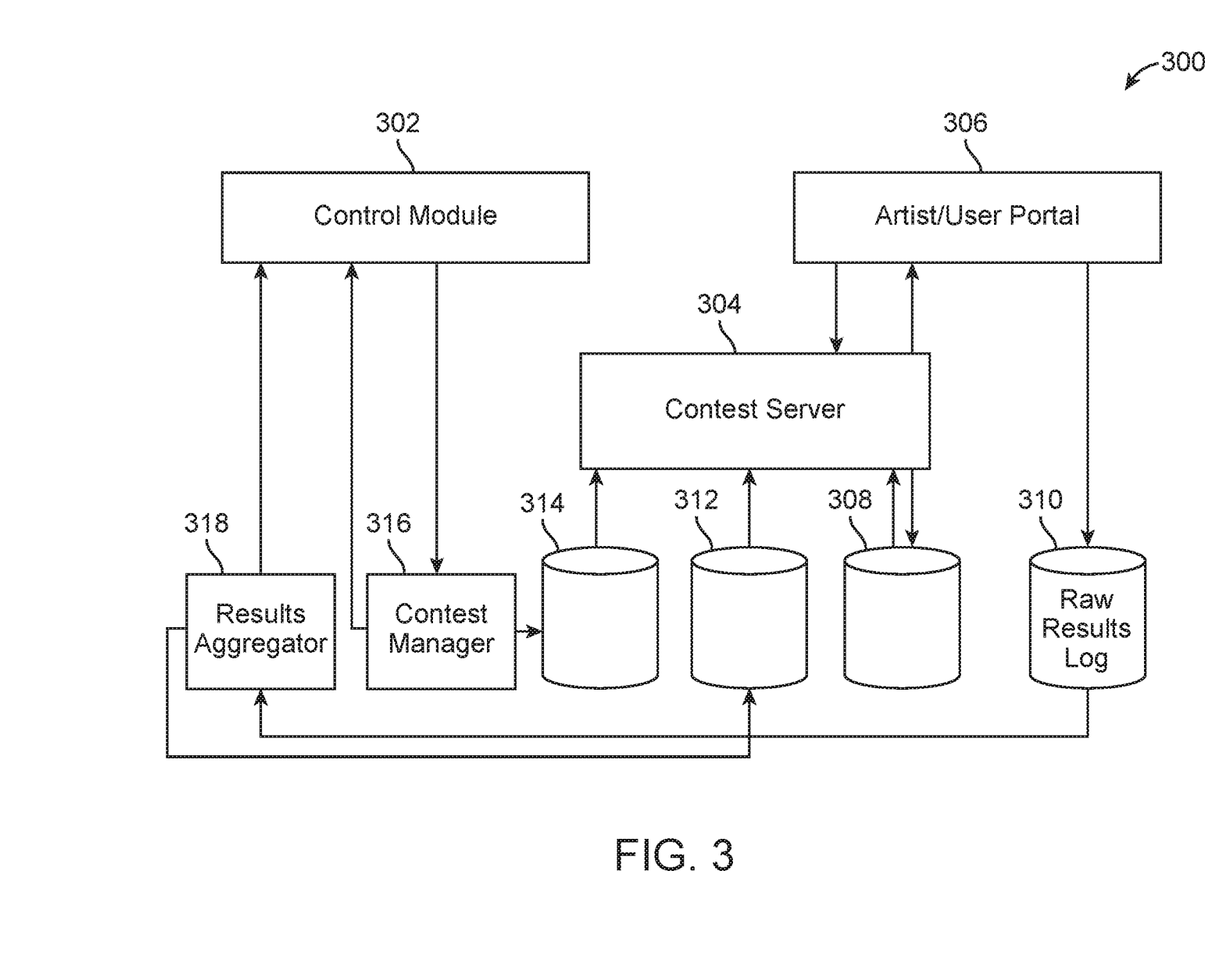
FIG. 3 is a block diagram representing a system architecture applicable to embodiments of the present invention.

Referring now to FIG. 3, a block diagram showing a system architecture applicable to embodiments of the present invention is shown generally at 300. As shown herein, this embodiment comprises an operator control panel 302, contest server 304, artist/user portal 306, raw results database 310, contest database aggregators 308, 312, 314, and contest manager 316. Data storage and logic components may be combined, refactored, or distributed in order to optimize system scalability and maintainability. Each arrow in FIG. 3 represents communicative coupling of the components, with the direction of the arrow indicates the dominant flow of the data. However, these couplings, in optional embodiments, may be performed concurrently or in different sequences in order to optimize system performance.

The control module 302 is a graphical user interface (GUI) in communication contest server 304. In operation, the operator of contests and set contests, and manage contest using the GUI. The contests servers 304, is configured to set up databases for contests, such as those databases shown at 308, 312, and 314. The databases are in communication with contest server 304, and with raw results log 310.

The contests servers 304 initialize the contests which may be recorded in data storage 308-314, for use by the contest server 304. The contests server 304 queries for aggregated results in data storage 314, and as results become available, adjusts the contests leaderboards required. The contest server 304 comprises logic that is quantifies voting and receives contest data to optimize financial return the operator, using for example, targeted advertising and geo-location.

The results aggregator 318 is in communication with contest manager 316 and control module 302 so as to route data back to control module 302 for review by the operators.

In the system of present invention, while only a server is shown for expediency, the system comprises a plurality of remote server configured to receive an input at least one of the plurality of servers and output a signal to a second of the plurality of servers based on a location of the first server of the plurality of servers, and a routing location of the input. This has advantages based on scaled global contests particularly as it relates to computer speed and efficiency.

Figure 4:
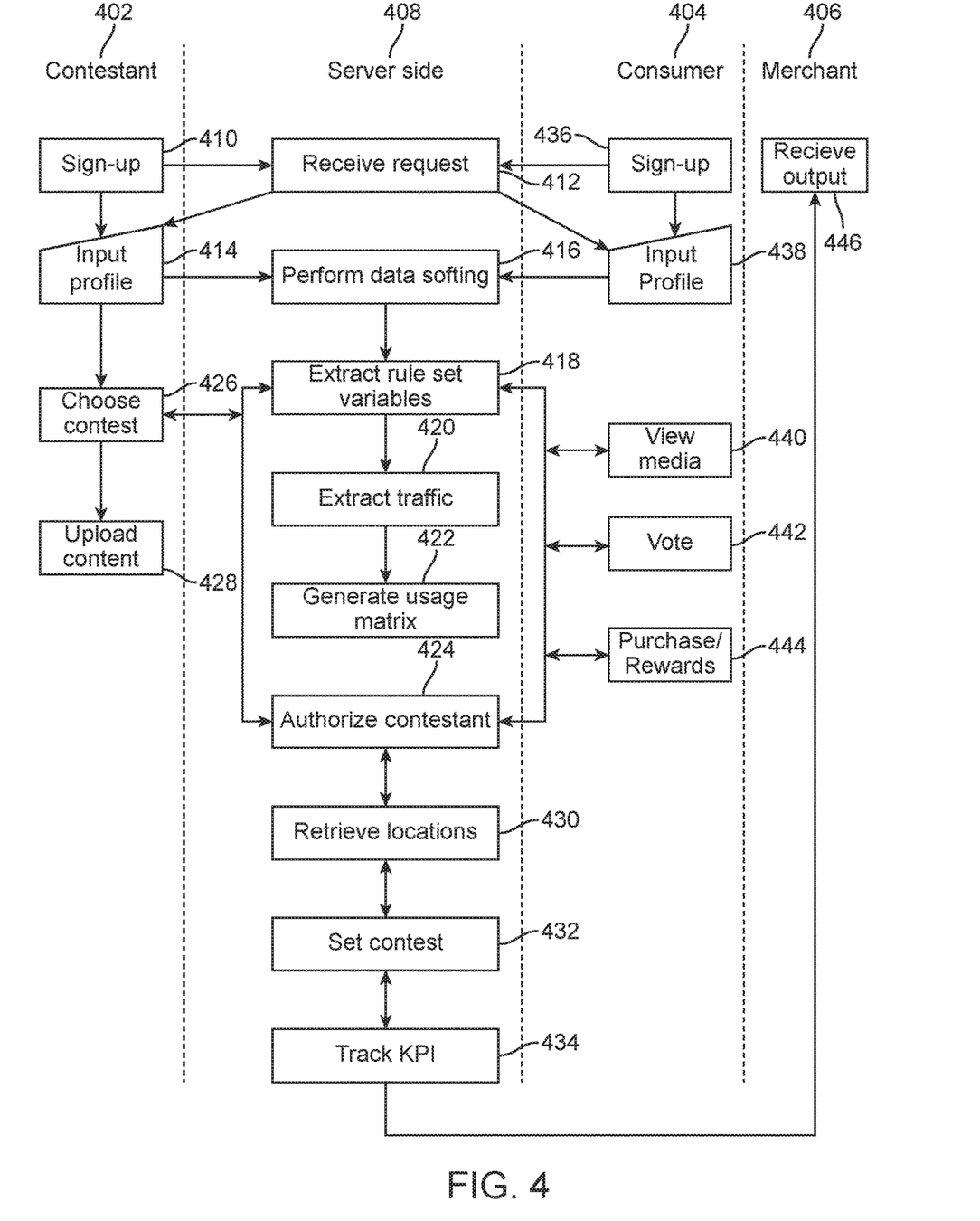
FIG. 4 is a swim-lane diagram of an example process for a networked contest.

Referring now to FIG. 4, a swim-lane diagram of an exemplary process for a networked contest is shown generally at 400. For example, the process 400 can be used by a contestant, consumer, and a merchant to benefit from the contest provided by the server. As such, FIG. 4 shows lanes for steps that can be performed by the contestant 402, the consumer 404, and the merchant 406. The server-side 408 ("server") executes many of the requests using a combination of hardware, software, and firmware, as described herein.

A contestant downloads a mobile application from a mobile app store, such as the Apple® App Store, 410. The server 408 receives the request 412 and sends the request using the policy server shown in FIG. 6. The contestant 402 then inputs a profile 414. The profile comprises identifying information, defines the user operating environment, and contains user profile can contain personal data such as name, address, gender, age and the like.

The server 408 performs data sorting 416 based on input profile 414 of the contestant 402. The server 408 is further configured to extract a first set of rules 418 based on the input profile. The rule sets are housed on the policy server, and are applied to the data based on input profile. For example, a first rule set may apply to a first contest for a given location or jurisdiction based on certain rules, e.g., which citizens in which states or jurisdictions are allowed to play in the contest, what age a contestant must be, what age a user must be, what age a merchant must be, what age a purchaser of product must be, and the like. The authorizations and rules sets are based on matrices identifying these variables and comparing them to the variables in the user inputs.

The server 408 is further configured to extract contestant traffic 420. For example, the contestant 402 will use the app to browse media and other content. Based on the history of the contestants browsing the server is configured to extract that traffic and sort it for targeted merchant exchange. The server 408 is further configured to generate a matrix based on the input profile and the extracted traffic data 422.

Authorization of contests 424 occurs during and after the policy server has extracted the rule set and determines that a contestant is eligible to participate in a contest. Once the authorization occurs, a list of authorized contents populates the GUI of the contestant, at which point the contestant can choose a contest 426, and upload media 428. Media is output e.g., by the media/contest server to, for example, a portable computing device (e.g., a smartphone).

A safeguard procedure is also in place. As shown at 430, the server can detect a location of the contestants. Should a contestants spend more than a predetermined amount of time in a certain jurisdiction or state in watch the contest is prohibited, the server 408 may send a notification to the user that the status Love him or her as a contestant is in danger due to residency requirements. The safeguards against contestants lying about his or her residency so as to be able to participate.

Administrative functions can be entered at the server 408 manually at a GUI. As an example the merchant or system admin may set up certain contests and rules manually or track key performance indicators using different predetermined indicia 434.

Turning now to the consumer side 404, like the contestant side a consumer downloads a mobile application from a mobile app store, such as the Apple App Store, and sign up 436. The server 408 receives the request 412 and sends the request using the policy server. The consumer 404 then inputs a profile 414. The profile comprises identifying information and defines the user operating environment, and contains user profile can contain personal data such as name, address, gender, age and the like.

The server 408 performs data sorting 416 based on input profile 438 of the consumer. The server 408 is further configured to extract a first set of rules 418 based on the input profile. The rule sets are housed on the policy server, and are applied to the data based on input profile. For example, a first rule set may apply to a voting on contests or making in-App purchase for a given location or jurisdiction based on certain rules. The authorizations and rule sets are based on matrices identifying these variables and comparing them to the variables in the user inputs.

The server 408 is further configured to extract consumer traffic 420. For example, the consumer 404, like the contestant 402 will use the app to browse media and other content 440. Based on the history of the contestants browsing the server is configured to extract that traffic and sort it for targeted merchant exchange. The server 408 is further configured to generate a matrix based on the input profile and the extracted traffic data 422.

Authorization of contests 424 for consumer voting 442 occurs during and after the policy server has extracted the rule set and determines that a contestant is eligible to vote in the contest. Once the authorization occurs a list of authorized contests to vote in will populate the GUI of the consumer, and the consumer can vote, make in-App purchases and earn rewards 444.

A safeguard procedure is also in place for the consumer side. As shown at 430, the server can detect a location of the contestants. Should a contestants spend more than a predetermined amount of time in a certain jurisdiction or state in watch the contest is prohibited, the server 408 may send a notification to the user that the status The safeguards against contestants lying about his or her residency so as to be able to participate.

The server for administrative functions that can be entered buy the server 408 side manually at a GUI. As an example the user may set up certain contests and rules manually or track key performance indicators using different predetermined indicia 434.

The merchant 406 is the beneficiary of output of the server 408 based on the processes, routines and sub-routines performed on both the contestant and user data. In this way, based on the matrices, the server is able to identify those contestants and consumer that have the highest probability of purchasing the merchant's goods and services, discussed in greater detail with reference to FIG. 5.

Figure 5:
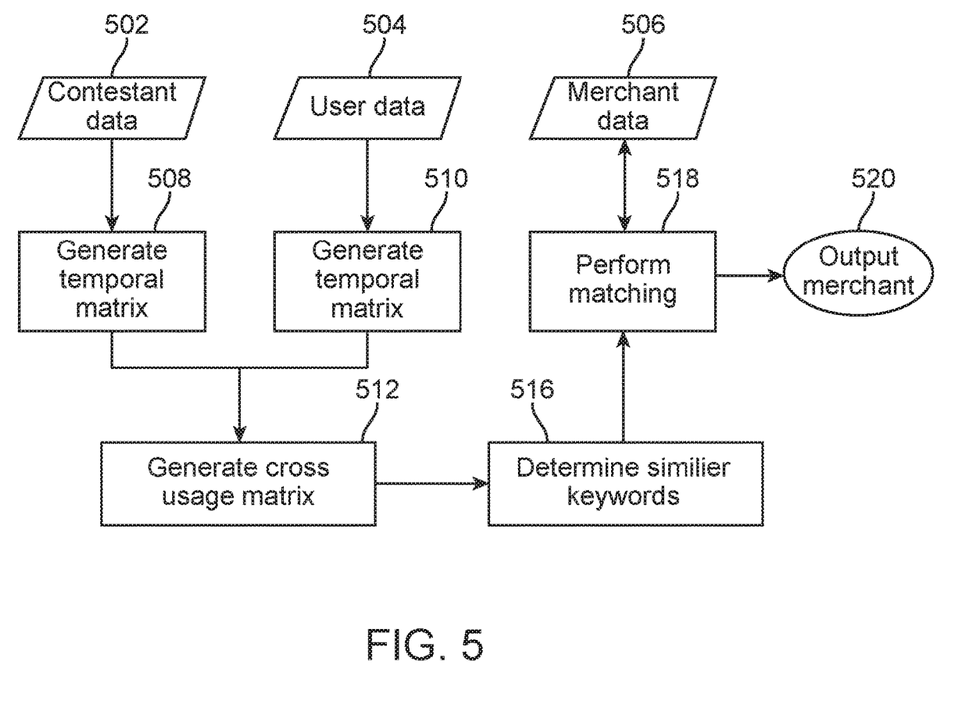
FIG. 5 is a flow chart illustrating an exemplary process of generating a cross-usage matrix to optimize advertising conversion.

FIG. 5 is a flow chart illustrating an exemplary process of generating a cross-usage matrix, in accordance with aspects of the present technique to optimize advertising conversion 500. As shown in FIG. 4, input information such as profile data, viewing records and searching records may be extracted from the App.

Contestant data 502, user data 504 and merchant data 506 are collected. A first temporal matrix is generated for the contestant data 502 and a second temporal matrix is generated for the user data 504. A cross usage matrix 512 is generated by combining be matrices 508 and 510. For example, if a contestant posts a skateboarding video, (c1) and the user 504 searches skateboarding (u1) and also surfing (u2), the system makes an assumption that the contestant may upload a surf video (c2) at some point as well. However, if the contestant uploads a snowboard video (c3), on the other hand, the system makes another assumption the user also enjoys snowboarding (u3). Scaled up, this allows the system to display predictive power as to what contestants and users have in common, and both enjoy. This data once generated in the cross usage matrix 512 and when compared with keywords 516 can be matched to output a highly predictive output to a merchant, thus optimizing targeted advertising.

Figure 6:
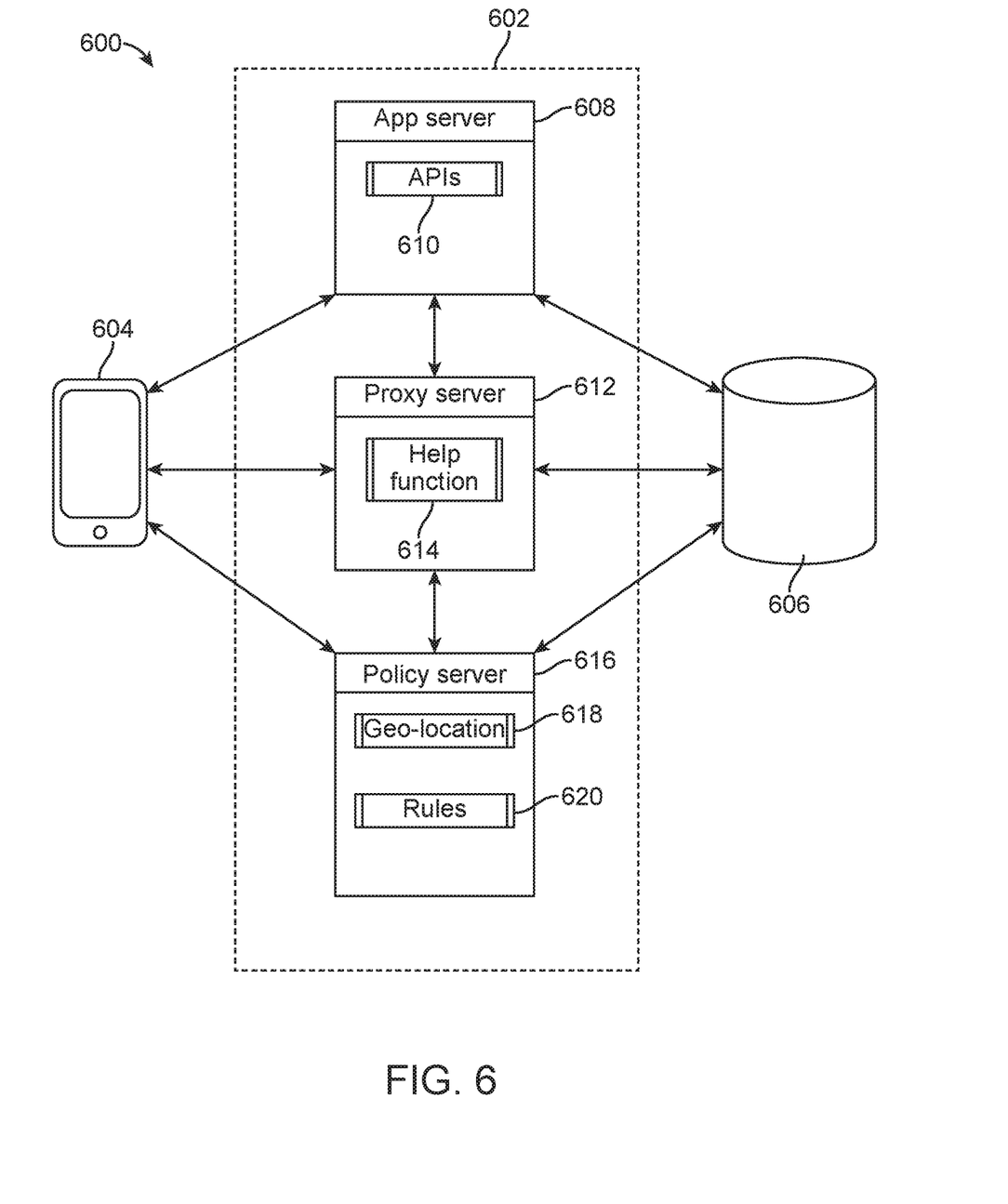
FIG. 6 a block diagram illustrating an exemplary client/server arrangement for networked contests.

Referring now to FIG. 6, an exemplary server farm is shown with each server running its own sub-processes for specific functionality, in turn, speeding up contest operation.

The system for conducting networked contests comprises one or storage devices 602 in communication with a client 604 and a database 606, each being operationally coupled with a network, and configured to display an application.

Each of a storage devices are servers having a plurality of processing subsystems 610, 614, 618, and 620, each of which are operationally coupled with the servers. An application server 608 configured to generate a cross-usage matrix based on the extracted data from the contestant and the consumer using APIs which group users and contestants according to behavior during the contests.

The App server 608 is further configured to sort input data, and index such that it is sortable based on keyword searches and metadata attached to the media.

The data storage module 606 is coupled to the application server such that the server may identify profile information such as a state of residence of the contestant using the input from the constant and geo-location of the client 604.

A proxy server 612 is further provided for client communication with management and the database, such as help sub-processing 614.

The policy server 616 is communicatively coupled to the database and configured to schedule contests based on geo-location data of users and admin input, and automatically sets authorizations for contestants and consumers based on the geo-location data and the predetermined variables.

Figure 7:
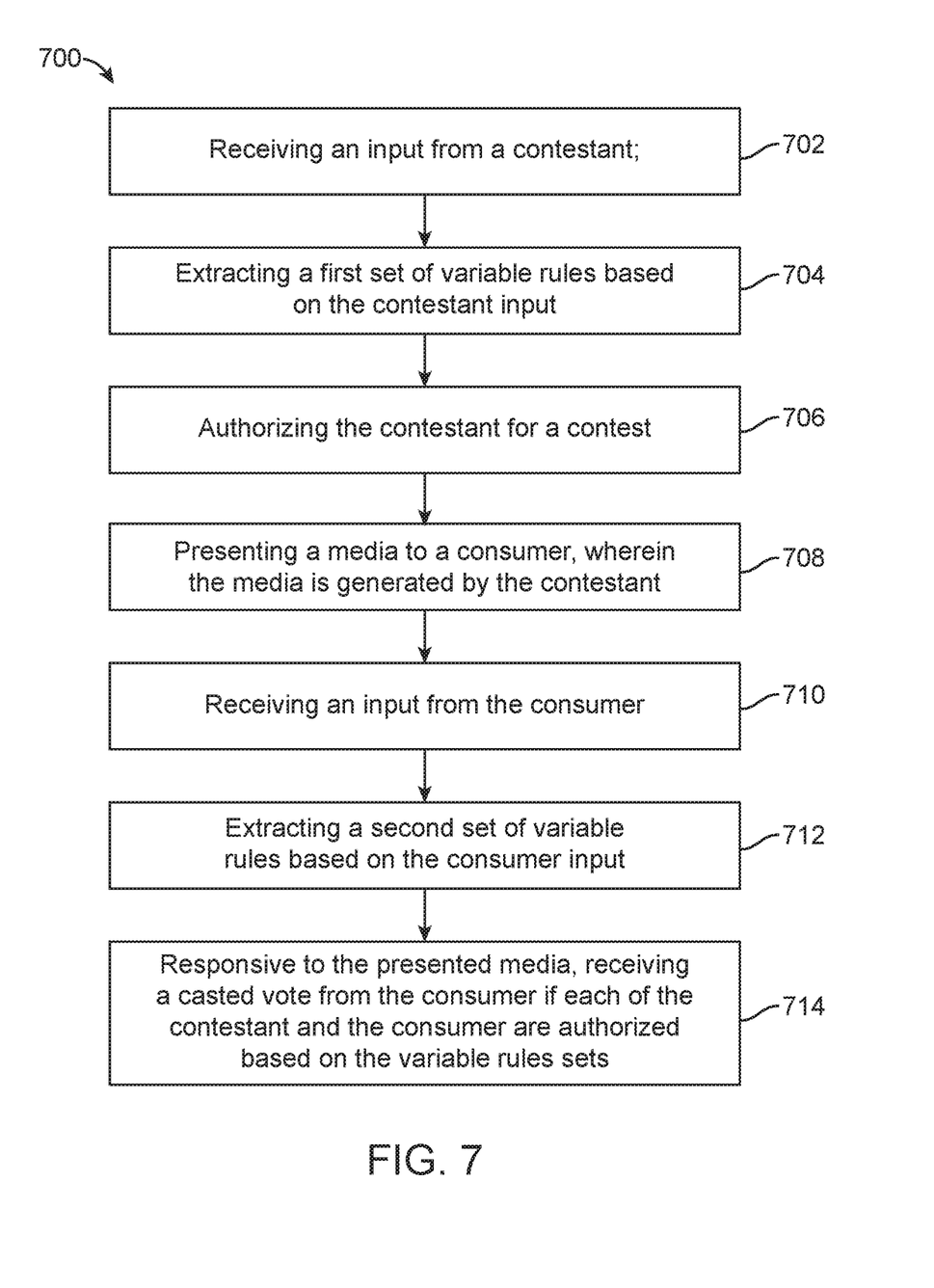
FIG. 7 is a flow-chart illustrating a step-wise method in accordance with embodiments of the present invention.

Referring now to FIG. 7, there is shown a flow chart to further illustrate a method for networked contests, shown generally at 700.

At step 702, the processor receives an input from a contestant.

At step 704, the processor extracts a first set of variable rules based on the contestant input.

At step 706, the processor authorizes the contestant for a contest.

At step 708, the processor presents a media to a consumer, the media being generated by the contestant.

At step 710, the processor receives an input from the consumer.

At step 712, the processor extracts a second set of variable rules based on the consumer input.

At step 714, responsive to the presented media, the processor receives a casted vote from the consumer if each of the contestant and the consumer are authorized based on the variable rules sets.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

Although specific features of various embodiments of the invention may be shown in some drawings and not in others, this is for convenience only. In accordance with the principles of the invention, the feature(s) of one drawing may be combined with any or all of the features in any of the other drawings. The words "including", "comprising", "having", and "with" as used herein are to be interpreted broadly and comprehensively and are not limited to any physical interconnection. Moreover, any embodiments disclosed herein are not to be interpreted as the only possible embodiments. Rather, modifications and other embodiments are intended to be included within the scope of the appended claims.

We claim:

1. A method performed by one or more processing devices for conducting a networked contest, the method comprising:

receiving an input from a client device being used by a contestant;

extracting a first set of variable rules based on the contestant input;

identifying a residence of the contestant using the input from the contestant and a geo-location data of the client device being used by the contestant, wherein the client device is a smartphone comprising a global positioning system (GPS);

authorizing the contestant for a contest;

tracking, via GPS and a policy server, the geo-location data of a contestant, and if the contestant spends more than a predetermined amount of time in a predetermined jurisdiction in which the contest is prohibited, automatically sending, via the server, a notification to the user that their status as a contest is revocable due to a residency requirement located on the policy server;

scheduling the contest based on the geo-location data of a plurality of users, and automatically setting authorizations for the contestants and the consumers based on the geo-location data;

presenting a media to a consumer, wherein the media is provided by the contestant;

receiving an input from the consumer;

extracting a second set of variable rules based on the consumer input; and responsive to the presented media, receiving a casted vote from the consumer if each of the contestant and the consumer are authorized based on the first and second variable rules sets.

2. The method of claim 1, further comprising generating a cross-usage matrix based on the input from the contestant and the consumer, wherein the cross-usage matrix groups contestants and consumers according to behavior during the contest.

3. The method of claim 2, further comprising matching contests and consumers with merchants based on the behavior and a merchant input.

4. The method of claim 1, wherein the contestant and the consumer input comprises profile inputs and activity logs.

5. The method of claim 1, further comprising sorting input data, wherein sorting data comprises indexing profile data and search data to form at least one index that is sortable based on keyword searches and metadata attached to the media.

6. The method of claim 1, further comprising configuring key performance indicator data by an operator at a graphical user interface.

7. The method of claim 2, further comprising applying advertisements from a merchant to contests using cross-usage matrix data to optimize advertisement targeting.

8. The method of claim 1, wherein receiving casted votes comprises aggregating and categorizing votes by a consumer type, wherein the consumer type is determined based on the consumer inputs.

9. A system for conducting networked contests, the system comprising one or storage devices for storing instructions that are executable to perform operations, the system comprising:
   a plurality of clients operationally coupled with a network, wherein the plurality of clients are associated with a plurality of contestants and display an application;
   a plurality of processing subsystems operationally coupled with the plurality of clients the network, wherein each of the plurality of processing subsystems is configured to:
      receive an input from a client device being used by a contestant;
      extract a first set of variable rules based on the contestant input;
      identify a residence of the contestant using the input from the contestant and a geo-location data of the client device being used by the contestant, wherein the client device is a smartphone comprising a global positioning system (GPS);
      authorize the contestant for a contest;
      track, via GPS and a policy server, the geo-location data of a contestant, and if the contestant spends more than a predetermined amount of time in a predetermined jurisdiction in which the contest is prohibited, automatically sending, via the server, a notification to the user that their status as a contest is revocable due to a residency requirement located on the policy server:
      schedule the contest based on the geo-location data of a plurality of users, and automatically setting authorizations for the contestants and the consumers based on the geo-location data;
      present a media to a consumer, wherein the media is provided by the contestant;
      receive an input from the consumer;
      extract a second set of variable rules based on the consumer input;
      responsive to the presented media, receive a casted vote from the consumer if each of the contestant and the consumer are authorized based on the variable rules sets.

10. The system of claim 9, wherein the plurality of processing subsystems comprises an application server for generating a cross-usage matrix based on the input data from the contestant and the consumer, wherein the cross-usage matrix groups users and contestants according to behavior during the contest.

11. The system of claim 9, wherein the contestant and the consumer input comprises profile inputs and activity logs.

12. The system of claim 9, wherein the application server sorts input data, wherein sorting data comprises indexing profile data and search data to form at least one index that is sortable based on keyword searches and metadata attached to the media.

13. The system of claim 9, wherein the plurality of processing subsystems further comprises an operator configurable key performance indicator module that is configurable by an operator at an operator graphical user interface.

14. The system of claim 9 comprising an advertising module for applying advertisements from a merchant to contests using cross-usage matrix data to optimize advertisement targeting.

15. The system of claim 13, wherein receiving casted votes comprises aggregating and categorizing votes by a consumer type, wherein the consumer type is determined based on inputs.

16. The system of claim 9, further comprising a proxy server for communicating directly with the contestant and consumer.

* * * * *